United States Patent
Cimpu et al.

(10) Patent No.: US 12,477,531 B2
(45) Date of Patent: Nov. 18, 2025

(54) METHODS AND APPARATUSES FOR SUPPORTING CENTRALIZED RADIO ACCESS NETWORK (CRAN) SCALABILITY

(71) Applicant: Telefonaktiebolaget LM Ericsson (publ), Stockholm (SE)

(72) Inventors: Virgil Cimpu, Ottawa (CA); Michael Petras, Ottawa (CA); Tomas Norling, Solna (SE); Tobias Lindquist, Spånga (SE); Franz Heiser, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 452 days.

(21) Appl. No.: 17/916,257

(22) PCT Filed: Apr. 2, 2020

(86) PCT No.: PCT/IB2020/053165
§ 371 (c)(1),
(2) Date: Sep. 30, 2022

(87) PCT Pub. No.: WO2021/198736
PCT Pub. Date: Oct. 7, 2021

(65) Prior Publication Data
US 2023/0145035 A1    May 11, 2023

(51) Int. Cl.
*H04W 72/1263*    (2023.01)
*H04W 72/563*    (2023.01)

(52) U.S. Cl.
CPC ..... *H04W 72/1263* (2013.01); *H04W 72/563* (2023.01)

(58) Field of Classification Search
CPC ........... H04W 72/1263; H04W 72/563; H04W 72/27; H04W 28/16; H04W 88/085
See application file for complete search history.

(56) References Cited

U.S. PATENT DOCUMENTS

| | | |
|---|---|---|
| 2010/0081442 A1 | 4/2010 | Kronestedt et al. |
| 2013/0148587 A1 | 6/2013 | Comeau |

(Continued)

FOREIGN PATENT DOCUMENTS

| | | | | |
|---|---|---|---|---|
| EP | 2849485 A1 * | 3/2015 | .......... | H04W 72/121 |

OTHER PUBLICATIONS

International Search Report and Written Opinion dated Dec. 4, 2020 issued in PCT Application No. PCT/IB2020/053165, consisting of 14 pages.

*Primary Examiner* — Charles C Jiang
*Assistant Examiner* — Margaret Marie Anderson
(74) *Attorney, Agent, or Firm* — Weisberg I.P. Law, P.A.

(57) ABSTRACT

Methods and apparatuses are provided for centralized radio access network (CRAN) scalability. In one embodiment, a network node includes processing circuitry configured to cause the network node to schedule at least one wireless device according to a radio resource partition, the radio resource partition representing a division of radio resources between at least two schedulers of a same cell, and each radio resource partition of the cell being assigned to a corresponding scheduler of the at least two schedulers; and receive, from at least one scheduler of the at least two schedulers, an indication of an amount of the radio resources that are scheduled by the at least one scheduler. In one embodiment, a network node includes processing circuitry configured to cause the network node to send, to a master scheduler, an indication of an amount of the radio resources that are scheduled by the network node.

26 Claims, 8 Drawing Sheets

(56) References Cited

U.S. PATENT DOCUMENTS

2018/0310328 A1* 10/2018 Lin .................... H04L 5/0035
2023/0024678 A1* 1/2023 Klotsche ............. H04W 16/10

* cited by examiner

METHODS AND APPARATUSES FOR
SUPPORTING CENTRALIZED RADIO
ACCESS NETWORK (CRAN) SCALABILITY

CROSS-REFERENCE TO RELATED
APPLICATIONS

This application is a Submission Under 35 U.S.C. § 371 for U.S. National Stage Patent Application of International Application Number: PCT/IB2020/053165, filed Apr. 2, 2020 entitled "METHODS AND APPARATUSES FOR SUPPORTING CENTRALIZED RADIO ACCESS NETWORK (CRAN) SCALABILITY," the entirety of which is incorporated herein by reference.

TECHNICAL FIELD

The present disclosure relates to wireless communications and, in particular, to apparatuses and methods to support centralized radio access network (CRAN) scalability.

BACKGROUND

Some radio access networks (RANs) may be more centralized than a typical RAN, e.g., some components, such as baseband processing components may be in a central location that is remote from the radio access point. For example, a centralized radio access network (CRAN) may be deployed on a collection of processing systems (servers/blades/nodes) at a central location. In order to dynamically scale CRAN depending on user traffic demand, it may be useful to allow several systems, implementing separate schedulers, to collaboratively provide services to users (e.g., wireless devices) located in the same cell. As the number of users in the cell increases, more processing systems can be dynamically added to support that cell.

However, techniques for more efficient scheduling of wireless devices in a cell with more than one processing system implementing separate schedulers are still being considered.

SUMMARY

Some embodiments of the present disclosure advantageously provide methods, apparatuses and systems to support centralized radio access network (CRAN) scalability with loosely coupled processing systems.

According to one aspect of the present disclosure, a method implemented in a network node is provided. The method includes scheduling at least one wireless device according to a radio resource partition. The radio resource partition represents a division of radio resources between at least two schedulers of a same cell, and each radio resource partition of the cell being assigned to a corresponding scheduler of the at least two schedulers. The method includes receiving, from at least one scheduler of the at least two schedulers, an indication of an amount of the radio resources that are scheduled by the at least one scheduler.

In some embodiments, the method further includes adjusting a size of the radio resource partition that is assigned to the at least one scheduler based at least in part on the received indication. In some embodiments, the method further includes adjusting a size of the radio resource partition that is assigned to the at least one scheduler based at least in part on a predetermined target condition. In some embodiments, the method further includes sending, to the at least one scheduler, an indication of the adjusted size of the radio resource partition that is assigned to the at least one scheduler. In some embodiments, scheduling the at least one wireless device according to the radio resource partition further includes scheduling, per time slot, the at least one wireless device: in a frequency range corresponding to the radio resource partition that is assigned to the network node; and according to a scheduling order associated with the assigned radio resource partition.

In some embodiments, the scheduling order relates to scheduling using resources starting from an end of the frequency range toward an opposite end of the frequency range. In some embodiments, the method further includes sending, to the at least one scheduler, an indication of at least one additional resource outside of the radio resource partition that is assigned to the at least one scheduler, the at least one additional resource being located in an adjacent radio resource partition. In some embodiments, the at least one additional resource is located in the adjacent radio resource partition based at least in part on a scheduling order associated with the adjacent radio resource partition and a scheduling order associated with the radio resource partition that is assigned to the at least one scheduler.

In some embodiments, the method further includes determining whether there is a scheduling conflict between at least two of the at least two schedulers; and when there is a scheduling conflict, indicating the scheduling conflict to the at least two of the at least two schedulers. In some embodiments, the method further includes sending, per time slot, the scheduling for the at least one wireless device to a multiplexer, MUX, to assemble a radio frame, the radio frame comprising scheduling performed by each of the at least two schedulers for the time slot. In some embodiments, the at least one scheduler is associated with a priority level and a size of the radio resource partition that is assigned to the at least one scheduler is based at least in part on the priority level. In some embodiments, the scheduling is a physical layer scheduling. In some embodiments, the at least two schedulers are associated with a centralized radio access network, CRAN. In some embodiments, the network node is configured to perform baseband processing in the CRAN.

According to an aspect of the present disclosure, a method implemented in a network node is provided. The method includes scheduling at least one wireless device according to a radio resource partition. The radio resource partition represents a division of radio resources between at least two schedulers of a same cell. Each radio resource partition of the cell is assigned to a corresponding scheduler of the at least two schedulers. The method includes sending, to a master scheduler, an indication of an amount of the radio resources that are scheduled by the network node.

In some embodiments of this aspect, the method further includes receiving, from the master scheduler, an indication of a size of the radio resource partition that is assigned to the network node. In some embodiments of this aspect, the size of the radio resource partition that is assigned to the network node is adjusted based at least in part on the indication of the amount of the radio resources that are scheduled by the network node. In some embodiments of this aspect, the size of the radio resource partition that is assigned to the network node is adjusted based at least in part on a predetermined target condition. In some embodiments of this aspect, scheduling the at least one wireless device according to the radio resource partition further includes scheduling, per time slot, the at least one wireless device: in a frequency range corresponding to the radio resource partition that is assigned to the network node; and according to a scheduling order associated with the assigned radio resource partition.

In some embodiments of this aspect, the scheduling order relates to scheduling using resources starting from an end of the frequency range toward an opposite end of the frequency range. In some embodiments of this aspect, the method further includes receiving, from the master scheduler, an indication of at least one additional resource outside of the radio resource partition that is assigned to the network node, the at least one additional resource being located in an adjacent radio resource partition. In some embodiments of this aspect, the at least one additional resource is located in the adjacent radio resource partition based at least in part on a scheduling order associated with the adjacent radio resource partition and a scheduling order associated with the radio resource partition that is assigned to the network node.

In some embodiments of this aspect, the method further includes receiving, from the master scheduler, an indication of a scheduling conflict between the network node and at least one other scheduler; and responsive to the received indication of the scheduling conflict, dropping at least one scheduled resource that is in conflict prior to sending the scheduling for the at least one wireless device to a physical layer for encoding. In some embodiments of this aspect, the method further includes sending, per time slot, the scheduling for the at least one wireless device to a multiplexer, MUX, to assemble a radio frame, the radio frame comprising scheduling performed by each of the at least two schedulers for the time slot. In some embodiments of this aspect, the network node is associated with a priority level and a size of the radio resource partition that is assigned to the network node is based at least in part on the priority level. In some embodiments of this aspect, the scheduling is a physical layer scheduling. In some embodiments of this aspect, the at least two schedulers are associated with a centralized radio access network, CRAN. In some embodiments of this aspect, the network node is a configured to perform baseband processing in the CRAN.

According to another aspect of the present disclosure, a network node including processing circuitry is provided. The processing circuitry is configured to cause the network node to schedule at least one wireless device according to a radio resource partition, the radio resource partition representing a division of radio resources between at least two schedulers of a same cell, and each radio resource partition of the cell being assigned to a corresponding scheduler of the at least two schedulers. The processing circuitry is configured to cause the network node to receive, from at least one scheduler of the at least two schedulers, an indication of an amount of the radio resources that are scheduled by the at least one scheduler.

In some embodiments of this aspect, the processing circuitry is further configured to cause the network node to adjust a size of the radio resource partition that is assigned to the at least one scheduler based at least in part on the received indication. In some embodiments of this aspect, the processing circuitry is further configured to cause the network node to adjust a size of the radio resource partition that is assigned to the at least one scheduler based at least in part on a predetermined target condition. In some embodiments of this aspect, the processing circuitry is further configured to cause the network node to send, to the at least one scheduler, an indication of the adjusted size of the radio resource partition that is assigned to the at least one scheduler.

In some embodiments of this aspect, the processing circuitry is configured to schedule the at least one wireless device according to the radio resource partition by being configured to cause the network node to schedule, per time slot, the at least one wireless device: in a frequency range corresponding to the radio resource partition that is assigned to the network node; and according to a scheduling order associated with the assigned radio resource partition. In some embodiments of this aspect, the scheduling order relates to scheduling using resources starting from an end of the frequency range toward an opposite end of the frequency range.

In some embodiments of this aspect, the processing circuitry is further configured to cause the network node to send, to the at least one scheduler, an indication of at least one additional resource outside of the radio resource partition that is assigned to the at least one scheduler, the at least one additional resource being located in an adjacent radio resource partition. In some embodiments of this aspect, the at least one additional resource is located in the adjacent radio resource partition based at least in part on a scheduling order associated with the adjacent radio resource partition and a scheduling order associated with the radio resource partition that is assigned to the at least one scheduler. In some embodiments of this aspect, the processing circuitry is further configured to cause the network node to determine whether there is a scheduling conflict between at least two of the at least two schedulers; and when there is a scheduling conflict, indicate the scheduling conflict to the at least two of the at least two schedulers.

In some embodiments of this aspect, the processing circuitry is further configured to cause the network node to send, per time slot, the scheduling for the at least one wireless device to a multiplexer, MUX, to assemble a radio frame, the radio frame comprising scheduling performed by each of the at least two schedulers for the time slot. In some embodiments of this aspect, the at least one scheduler is associated with a priority level and a size of the radio resource partition that is assigned to the at least one scheduler is based at least in part on the priority level. In some embodiments of this aspect, the scheduling is a physical layer scheduling. In some embodiments of this aspect, the at least two schedulers are associated with a centralized radio access network, CRAN. In some embodiments of this aspect, the network node is configured to perform baseband processing in the CRAN.

According to an aspect of the present disclosure, a network node including processing circuitry is provided. The processing circuitry is configured to cause the network node to schedule at least one wireless device according to a radio resource partition, the radio resource partition representing a division of radio resources between at least two schedulers of a same cell, and each radio resource partition of the cell being assigned to a corresponding scheduler of the at least two schedulers. The processing circuitry is configured to cause the network node to send, to a master scheduler, an indication of an amount of the radio resources that are scheduled by the network node.

In some embodiments of this aspect, the processing circuitry is further configured to cause the network node to receive, from the master scheduler, an indication of a size of the radio resource partition that is assigned to the network node. In some embodiments of this aspect, the size of the radio resource partition that is assigned to the network node is adjusted based at least in part on the indication of the amount of the radio resources that are scheduled by the network node. In some embodiments of this aspect, the size of the radio resource partition that is assigned to the network node is adjusted based at least in part on a predetermined target condition.

In some embodiments of this aspect, the processing circuitry is configured to cause the network node to schedule the at least one wireless device according to the radio resource partition by being configured to cause the network node to schedule, per time slot, the at least one wireless device: in a frequency range corresponding to the radio resource partition that is assigned to the network node; and according to a scheduling order associated with the assigned radio resource partition. In some embodiments of this aspect, the scheduling order relates to scheduling using resources starting from an end of the frequency range toward an opposite end of the frequency range.

In some embodiments of this aspect, the processing circuitry is further configured to cause the network node to receive, from the master scheduler, an indication of at least one additional resource outside of the radio resource partition that is assigned to the network node, the at least one additional resource being located in an adjacent radio resource partition. In some embodiments of this aspect, the at least one additional resource is located in the adjacent radio resource partition based at least in part on a scheduling order associated with the adjacent radio resource partition and a scheduling order associated with the radio resource partition that is assigned to the network node. In some embodiments of this aspect, the processing circuitry is further configured to cause the network node to receive, from the master scheduler, an indication of a scheduling conflict between the network node and at least one other scheduler; and responsive to the received indication of the scheduling conflict, drop at least one scheduled resource that is in conflict prior to sending the scheduling for the at least one wireless device to a physical layer for encoding.

In some embodiments of this aspect, the processing circuitry is further configured to cause the network node to send, per time slot, the scheduling for the at least one wireless device to a multiplexer, MUX, to assemble a radio frame, the radio frame comprising scheduling performed by each of the at least two schedulers for the time slot. In some embodiments of this aspect, the network node is associated with a priority level and a size of the radio resource partition that is assigned to the network node is based at least in part on the priority level. In some embodiments of this aspect, the scheduling is a physical layer scheduling. In some embodiments of this aspect, the at least two schedulers are associated with a centralized radio access network, CRAN. In some embodiments of this aspect, the network node is a configured to perform baseband processing in the CRAN.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
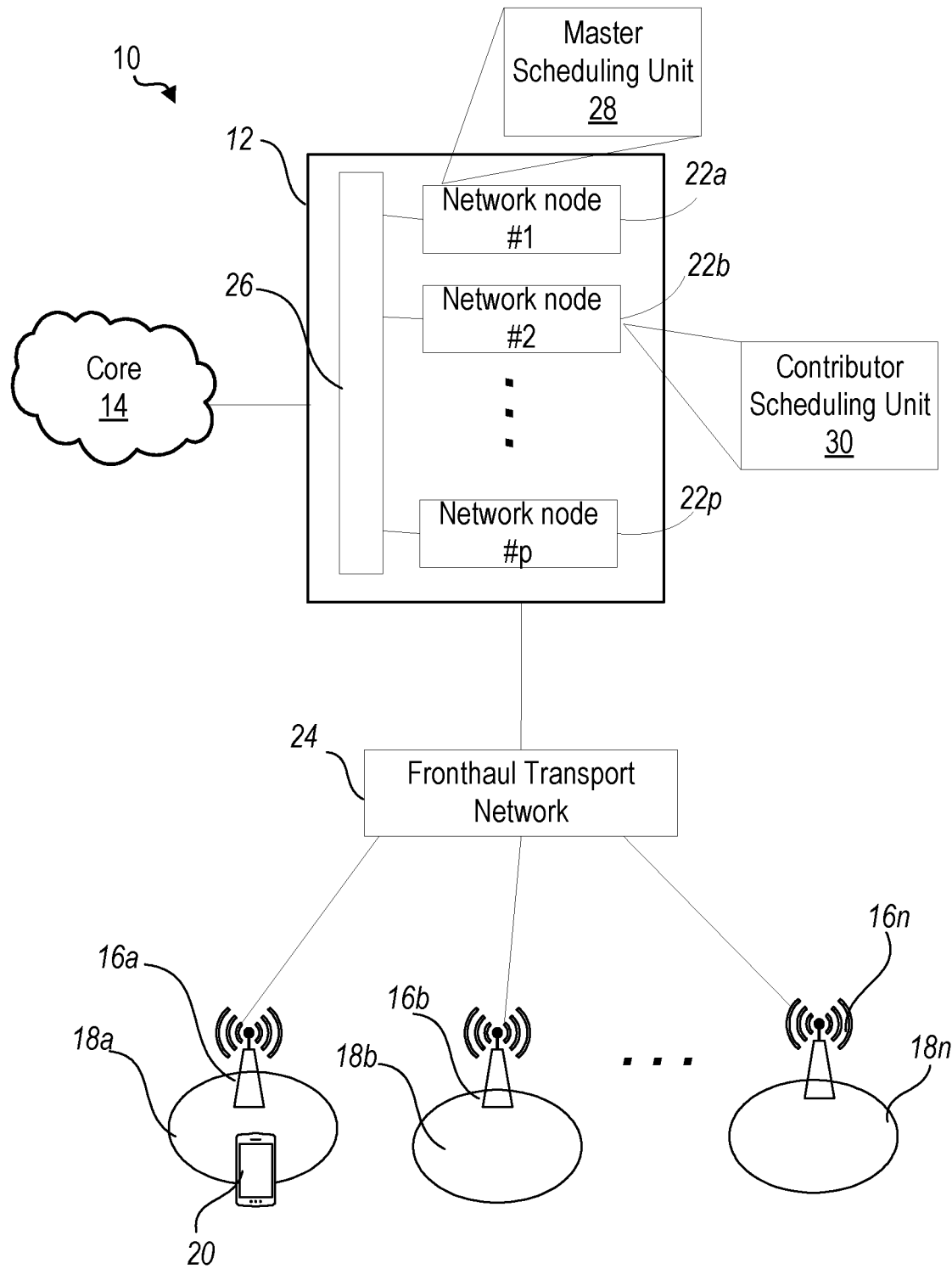
FIG. 1 is a schematic diagram of an example network architecture illustrating a communication system according to the principles in the present disclosure.

Besides a scalability approach as in CRAN, the method of allowing several systems to collaboratively schedule radio resources in the same cell can also be applied for one or more of the following use cases:
  sharing the spectrum between services implemented on separate servers; and/or
  providing seamless software upgrades where users are slowly migrated from a server running the old software to a server running a new software version.

Some embodiments of the present disclosure may apply in the case where there are two or more systems implementing a base station (e.g., eNB or gNB) and where there is limited bandwidth and/or a higher latency connection between them.

Current CRAN implementations deployed on pools of processing systems use distributed scheduling techniques which require a high level of scheduling synchronization between the individual processing systems, which in turn requires low latency and/or a high bandwidth transport network.

Some embodiments of the present disclosure include a method of supporting collaboration between schedulers hosted in different processing systems connected by a transport network such as a transport network with a relatively low bandwidth and/or a medium-high level of delay.

Some embodiments of the present disclosure provide for radio resource partitioning between the individual schedulers that may slowly change/adjust based on, e.g., statistical usage history and/or an end-goal policy/target condition. In some embodiments, to further optimize radio resource utilization in a cell, the individual schedulers may be allowed to tentatively (e.g., per scheduler request, per slot basis, etc.) use more resources than is available in their allocated/assigned partition. In some embodiments, one scheduler, which may be called a master scheduler, may be in charge of generating common channels and also arbitrating between resource utilization by the individual contributor/participating schedulers. Several options may exist regarding the connectivity between the baseband processing systems and the radio units (e.g., fronthaul optical fiber, copper wire, etc.).

Some embodiments of the present disclosure may provide a simple but dynamic technique for scheduling resources between baseband processing systems which are dynamically sharing the same frequency spectrum. In some embodiments, there may advantageously be no need for coordinated scheduling between the scheduling nodes, and with only a few short messages (e.g., one or two short messages) being exchanged per time resource (e.g., per slot) between the contributor schedulers and the master scheduler. This may allow for minimum coupling between the baseband processing systems. Some embodiments may be particularly advantageous when the transport network between the nodes (e.g., between the baseband processing nodes) has relatively low bandwidth and/or a medium-to-high level of delay.

Before describing in detail exemplary embodiments, it is noted that the embodiments reside primarily in combinations of apparatus components and processing steps related to apparatuses and methods to support centralized radio access network (CRAN) scalability with loosely coupled processing systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network, such as, for example, a centralized radio access network. The network node may be a scheduler node. The network node may comprise a baseband processing unit associated with a remote radio unit.

In some embodiments, the network node may include and/or be a part of and/or implement a functionality for any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the general term "radio resources" or "a plurality of radio resources" may be used herein interchangeably with "carrier," "shared carrier," "spectrum," and "shared spectrum" and may be used to indicate a frequency range that is shared between schedulers for a cell supported by the schedulers according to the techniques disclosed herein.

In some embodiments, a carrier can be split/divided into two or more partitions, and this may be referred to herein by the term "radio resource partition" which may represent a subset of the carrier's radio resources that are assign to one partition.

In some embodiments, a radio resource (RR) partition may be called RR part, for short.

In some embodiments, a CRAN may also be called "Elastic RAN".

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

Any two or more embodiments described in this disclosure may be combined in any way with each other.

A channel may generally be a logical, transport or physical channel. A channel may comprise and/or be arranged on one or more subcarriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a physical downlink control channel (PDCCH), a physical downlink shared channel (PDSCH), a physical uplink control channel (PUCCH) and a physical uplink shared channel (PUSCH).

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

In some embodiments, the term "resource" is intended to indicate a frequency resource and/or a time resource. In some embodiments, a single "radio resource" refers to the smallest time-frequency resource unit used for downlink/uplink transmission, i.e., one subcarrier per symbol.

The term time resource used herein may correspond to any type of physical resource expressed in terms of length of time. Examples of time resources are: symbol, time slot, subframe, radio frame, TTI, etc. As used herein, in some embodiments, the terms "subframe," "slot," "subframe/slot" and "time resource" are used interchangeably and are intended to indicate a time resource and/or a time resource number.

A cell may be generally a communication cell, e.g., of a cellular or mobile communication network, provided by one or more nodes. A serving cell may be a cell on or via which a radio access point (the node providing or associated to the cell, e.g., base station or eNodeB or gNodeB) transmits and/or may transmit data to a WD, in particular control and/or user or payload data, and/or via or on which a WD transmits and/or may transmit data to the node; a serving cell may be a cell for or on which the WD is configured and/or to which it is synchronized and/or has performed an access procedure, e.g., a random access procedure, and/or in relation to which it is in a RRC_connected or RRC_idle state, e.g., in case the node and/or WD and/or network follow the LTE and/or NR (5G) standard. One or more carriers (e.g., uplink and/or downlink carrier/s and/or a carrier for both uplink and downlink) may be associated to a cell.

Note that although terminology from one particular wireless system, such as, for example, Third Generation Partnership Project (3GPP) Long Term Evolution (LTE) and/or New Radio (NR), also called 5G, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a network node may be distributed over a plurality of network nodes. In other words, it is contemplated that the functions of the network node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide apparatuses and methods to support centralized radio access network (CRAN) scalability with loosely coupled processing systems.

Referring now to the drawing figures, in which like elements are referred to by like reference numerals, there is shown in FIG. 1 a schematic diagram of a communication system 10, according to an embodiment, such as a 3GPP-type cellular network (e.g., CRAN) that may support standards such as LTE and/or NR (5G), which comprises a processing center 12, such as a centralized processing center, and a core network 14. The remote radio access points (RAP) (RAP 16a, RAP 16b, . . . RAP 16n, collectively radio access points 16 or RAPs 16), such a remote radio units (RRUs) or remote radio heads (RRHs), each defined a corresponding coverage area 18a, 18b, . . . 18n (referred to collectively as coverage areas 18, which may also be interchangeably called a "cell"). A wireless device (WD) 20 located in coverage area 18a is configured to wirelessly connect to, or be paged by, the corresponding radio access point 16a. While only one WD 20 is illustrated in this example, disclosed embodiments are equally applicable to a situation in which there are a plurality of WDs 20 connecting to the corresponding radio access point 16a. The processing center 12 comprises a plurality of network nodes 22a, 22b, . . . 22p (referred to collectively as network nodes 22, where p can be any number greater than 1), such as baseband units (BBUs) or other types of processing systems (servers/blades/nodes). Two or more of the network nodes 22 may be associated with the radio access point 16a to provide the corresponding coverage area 18a for the WD 20 located in the coverage area 18a. The radio access points 16 may be connectable to the processing center 12 over a fronthaul transport network 24, which may include one or more wired and/or wireless connections. The two or more network nodes 22 e.g., in the processing center 12 may be connected together via a transport network 26, which may include one or more wired and/or wireless connections. Although, FIG. 1 illustrates the network nodes 22 being within a processing center 12, some embodiments may be implemented with the network nodes 22 being distributed across different locations, as with for example Elastic RAN (e.g., network nodes 22 being distributed in multiple processing centers 12 located at different locations). In some such embodiments, the transport network 26 connecting such network nodes 22 together may have a low throughput and/or a high latency.

Also, it is contemplated that a WD 20 can be in simultaneous communication and/or configured to separately communicate with more than one radio access point 16 and more than one type of radio access point 16. For example, a WD 20 can have dual connectivity with a radio access point 16 that supports LTE and the same or a different radio access point 16 that supports NR. As an example, WD 20 can be in communication with an eNB for LTE/E-UTRAN and a gNB for NR/NG-RAN.

A network node such as network node 22a is configured to include master scheduling unit 28 which is configured to cause the network node 22a to schedule at least one wireless device according to a radio resource partition, the radio resource partition representing a division of radio resources between at least two schedulers of a same cell, and each radio resource partition of the cell being assigned to a corresponding scheduler of the at least two schedulers; and receive, from at least one scheduler (e.g., network node 22a) of the at least two schedulers, an indication of an amount of the radio resources that are scheduled by the at least one scheduler.

A network node such as network node 22b is configured to include contributor scheduling unit 30 which is configured to cause the network node 22b to schedule at least one wireless device according to a radio resource partition, the radio resource partition representing a division of radio resources between at least two schedulers of a same cell, and each radio resource partition of the cell being assigned to a corresponding scheduler of the at least two schedulers; and send, to a master scheduler (e.g., network node 22a), an indication of an amount of the radio resources that are scheduled by the network node 22b.

Figure 2:
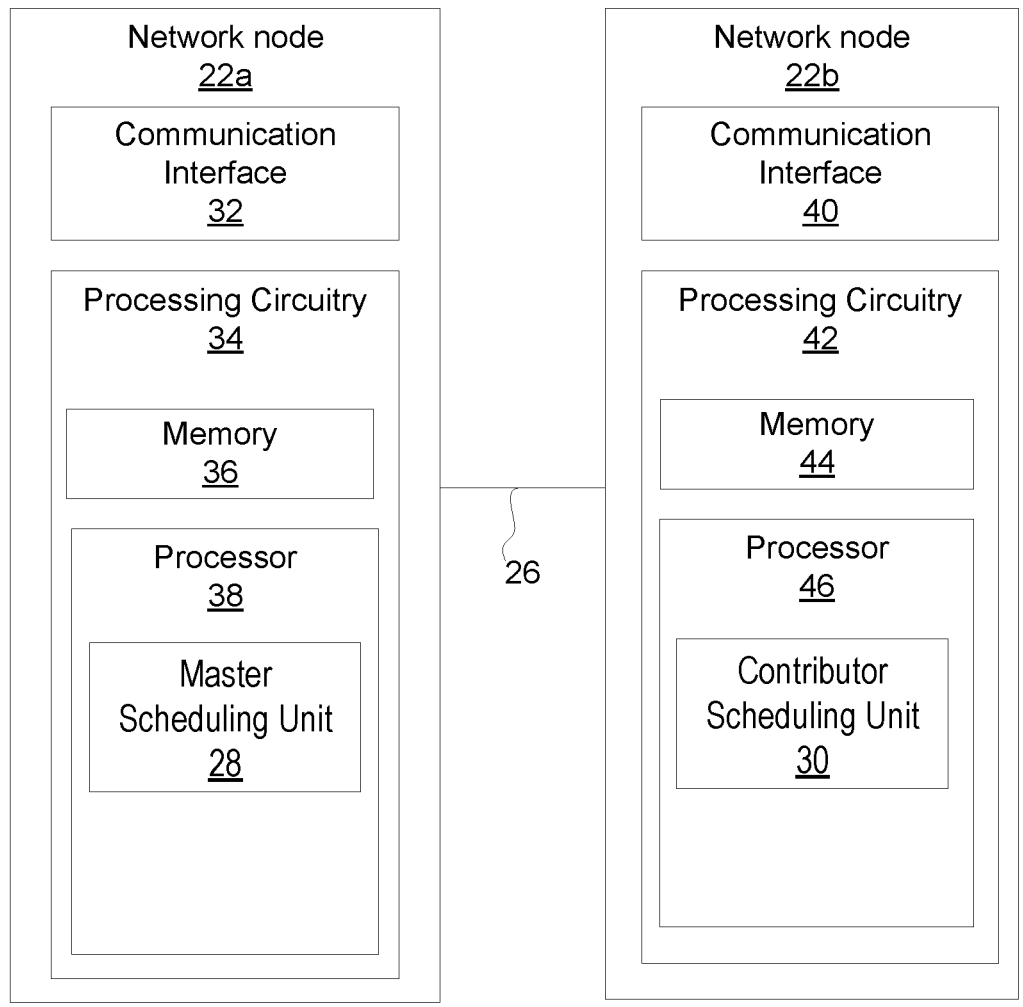
FIG. 2 is a block diagram of a network node in communication with another network node over a connection according to some embodiments of the present disclosure.

Example implementations, in accordance with an embodiment, of the network node 22a and network node 22b discussed in the preceding paragraphs will now be described with reference to FIG. 2. In FIG. 2, another example system 10 in accordance with the present disclosure is shown.

Note that although only two network nodes, network node 22a and network node 22b are shown for convenience, the communication system 10 may include many more network nodes, which may include schedulers for a CRAN that may implement one or more of the techniques disclosed herein.

It should be noted that although the example embodiment in FIG. 2 shows network node 22a and network node 22b as separate devices, each having its own components (e.g., communication interface, processing circuitry, memory, processor, etc.), some embodiments may be implemented in a cloud computing environment in which the functionality described herein with respect to each network node 22a and network node 22b may be implemented by devices and/or physical resources (e.g., compute, network, storage, etc.) distributed within the cloud computing environment. Some embodiments of the present disclosure may not be in the cloud, but may otherwise be deployed in a central location, such as, for example, a central processing office and/or a baseband unit (BBU) hotel or BBU pool.

The network node 22a (e.g., master scheduler) and network node 22b (e.g., contributor scheduler) may be connected via a transport network 26, which may include one or more wired and/or wireless connections.

The network node 22a (e.g., master scheduler) includes a communication interface 32, processing circuitry 34, and memory 36. The communication interface 32 may be configured to communicate with one or more of the other network nodes and/or other elements in the system 10 to perform scheduling according one or more the techniques disclosed herein. In some embodiments, the communication interface 32 may be formed as or may include, for example, one or more radio frequency (RF) transmitters, one or more RF receivers, and/or one or more RF transceivers, and/or may be considered a radio interface. In some embodiments, the communication interface 32 may include a wired interface, such as one or more network interface cards.

The processing circuitry 34 may include one or more processors 38 and memory, such as, the memory 36. In particular, in addition to a traditional processor and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 22a may further include software stored internally in, for example, memory 36, or stored in external memory (e.g., storage resource in a cloud environment) accessible by the network node 22a via an external connection. The software may be executable by the processing circuitry 34. The processing circuitry 34 may be configured to control any of the methods and/or processes described herein and/or to cause such methods, and/or processes to be performed, e.g., by the network node 22a (e.g., a master scheduler). The memory 36 is configured to store data, programmatic software code and/or other information described herein. In some embodiments, the software may include instructions stored in memory 36 that, when executed by the processor 38 and/or master scheduling unit 28, causes the processing circuitry 34 and/or configures the network node 22a to perform the processes described herein with respect to the network node 22a (e.g., processes described with reference to FIG. 3 and/or any of the other flowcharts).

The network node 22b (e.g., contributor scheduler) includes a communication interface 40, processing circuitry 42, and memory 44. The communication interface 40 may be configured to communicate with one or more of the other network nodes and/or other elements in the system 10 to perform scheduling according one or more the techniques disclosed herein. In some embodiments, the communication interface 40 may be formed as or may include, for example, one or more radio frequency (RF) transmitters, one or more RF receivers, and/or one or more RF transceivers, and/or may be considered a radio interface. In some embodiments, the communication interface 40 may include a wired interface, such as one or more network interface cards.

The processing circuitry 42 may include one or more processors 46 and memory, such as, the memory 44. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 22b (e.g., contributor scheduler) may further include software stored internally in, for example, memory 44, or stored in external memory (e.g., storage resource in a cloud environment) accessible by the network node 22b via an external connection. The software may be executable by the processing circuitry 42. The processing circuitry 42 may be configured to control any of the methods and/or processes described herein and/or to cause such methods, and/or processes to be performed, e.g., by the network node 22b (e.g., contributor scheduler). The memory 44 is configured to store data, programmatic software code and/or other information described herein. In some embodiments, the software may include instructions stored in memory 44 that, when executed by the processor 46 and/or contributor scheduling unit 30, causes the processing circuitry 42 and/or configures the network node 22b to perform the processes described herein with respect to the network node 22b (e.g., processes described with reference to FIG. 4 and/or any of the other flowcharts).

In some embodiments, the inner workings of the network node 22a and network node 22b, may be as shown in FIG. 2 and independently, the surrounding network topology may be that of FIG. 1.

Although FIGS. 1 and 2 show various "units" such as master scheduling unit 28 and contributor scheduling unit 30 as being within a processor, it is contemplated that these units may be implemented such that a portion of the unit is stored in a corresponding memory within the processing circuitry. In other words, the units may be implemented in hardware or in a combination of hardware and software within the processing circuitry.

In some embodiments, the general term "scheduler" may be used and may indicate the master scheduling unit 28 and/or the contributor scheduling unit 30 and/or a network node including one or more of such units 28 and 30. In some embodiments, the term "master scheduler" may be used and may indicate the master scheduling unit 28 and/or a network node such as network node 22a that includes a master scheduling unit 28 and/or implements functions of master scheduling unit 28. In some embodiments, the term "contributor scheduler" may be used and may indicate contributor scheduling unit 30 and/or a network node such as network node 22b that includes contributor scheduling unit 30 and/or implements functions of contributor scheduling unit 30.

In addition, although FIGS. 1 and 2 show master scheduling unit 28 as being within network node 22a (e.g., maser scheduler) and contributor scheduling unit 30 as being with network node 22b (e.g., contributor scheduler), it is contemplated that in some embodiments a network node 22 may include both of these units and may configured to operate as a master scheduler or a contributor scheduler according to the techniques disclosed.

Figure 3:
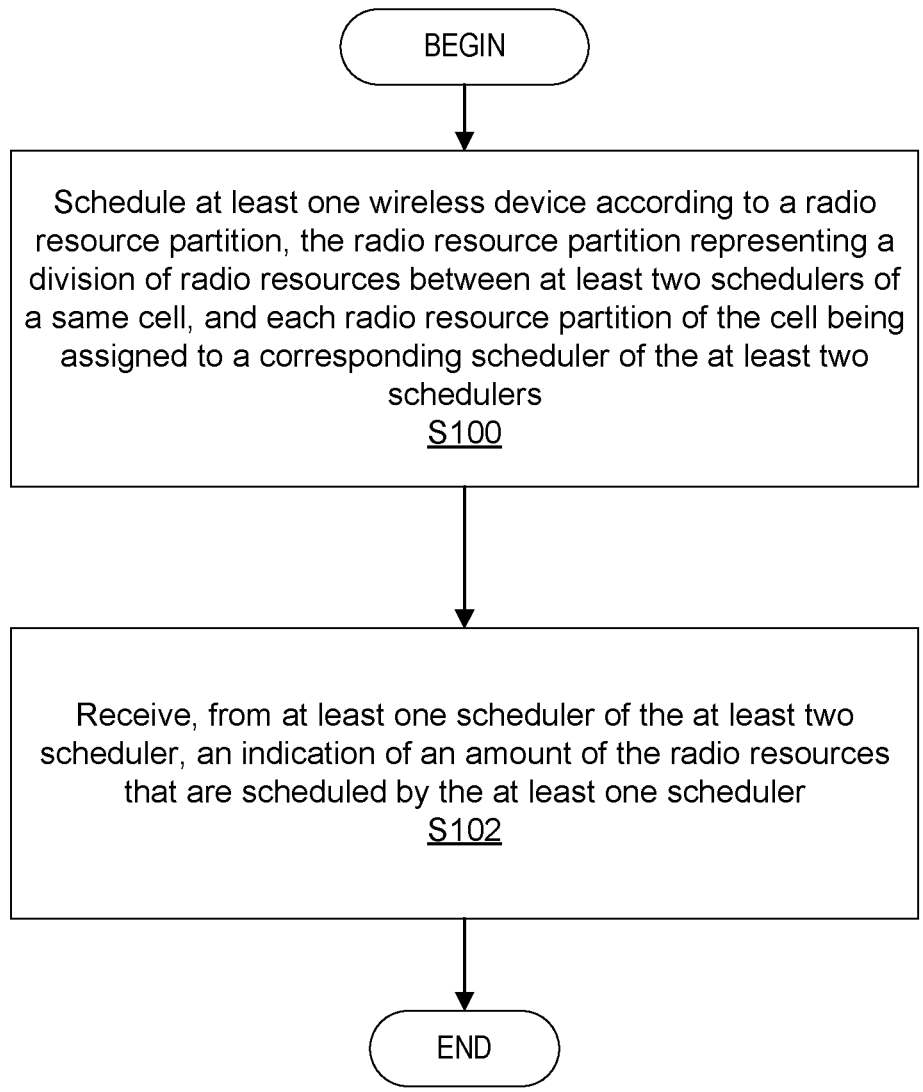
FIG. 3 is a flowchart of an example method for a network node for a master scheduling unit according to one embodiment of the present disclosure.

FIG. 3 is a flowchart of an exemplary process in a network node 22, such as network node 22a (e.g., master scheduler) according to some embodiments of the present disclosure. One or more Blocks and/or functions and/or methods performed by the network node 22a may be performed by one or more elements of network node 22a such as by master scheduling unit 28 in processing circuitry 34, processor 38, memory 36, communication interface 32, etc. according to the example method. The example method includes scheduling (Block S100), such via master scheduling unit 28, processing circuitry 34, processor 38, memory 36 and/or communication interface 32, at least one wireless device 20 according to a radio resource partition, the radio resource partition representing a division of radio resources between at least two schedulers of a same cell, and each radio resource partition of the cell being assigned to a corresponding scheduler of the at least two schedulers. The method includes receiving (Block S102), such via master scheduling unit 28, processing circuitry 34, processor 38, memory 36 and/or communication interface 32, from at least one scheduler of the at least two schedulers, an indication of an amount of the radio resources that are scheduled by the at least one scheduler.

In some embodiments, the method further includes adjusting, such via master scheduling unit 28, processing circuitry 34, processor 38, memory 36 and/or communication interface 32, a size of the radio resource partition that is assigned to the at least one scheduler based at least in part on the received indication. In some embodiments, the method further includes adjusting, such via master scheduling unit 28, processing circuitry 34, processor 38, memory 36 and/or communication interface 32, a size of the radio resource partition that is assigned to the at least one scheduler based at least in part on a predetermined target condition. In some embodiments, the method further includes sending, such via master scheduling unit 28, processing circuitry 34, processor 38, memory 36 and/or communication interface 32, to the at least one scheduler, an indication of the adjusted size of the radio resource partition that is assigned to the at least one scheduler.

In some embodiments, scheduling the at least one wireless device 20 according to the radio resource partition further includes scheduling, per time slot, the at least one wireless device 20: in a frequency range corresponding to the radio resource partition that is assigned to the network node 22a; and according to a scheduling order associated with the assigned radio resource partition. In some embodiments, the scheduling order relates to scheduling using resources starting from an end of the frequency range toward an opposite end of the frequency range. In some embodiments, the method further includes sending, such via master scheduling unit 28, processing circuitry 34, processor 38, memory 36 and/or communication interface 32, to the at least one scheduler, an indication of at least one additional resource outside of the radio resource partition that is assigned to the at least one scheduler, the at least one additional resource being located in an adjacent radio resource partition.

In some embodiments, the at least one additional resource is located in the adjacent radio resource partition based at least in part on a scheduling order associated with the adjacent radio resource partition and a scheduling order associated with the radio resource partition that is assigned to the at least one scheduler. In some embodiments, the method further includes determining, such via master scheduling unit 28, processing circuitry 34, processor 38, memory 36 and/or communication interface 32, whether there is a scheduling conflict between at least two of the at least two schedulers; and when there is a scheduling conflict, indicating, such via master scheduling unit 28, processing circuitry 34, processor 38, memory 36 and/or communication interface 32, the scheduling conflict to the at least two of the at least two schedulers.

In some embodiments, the method further includes sending, such via master scheduling unit 28, processing circuitry 34, processor 38, memory 36 and/or communication interface 32, per time slot, the scheduling for the at least one wireless device 20 to a multiplexer, MUX, to assemble a radio frame, the radio frame comprising scheduling performed by each of the at least two schedulers for the time slot. In some embodiments, the at least one scheduler is associated with a priority level and a size of the radio resource partition that is assigned to the at least one scheduler is based at least in part on the priority level. In some embodiments, the scheduling is a physical layer scheduling. In some embodiments, the at least two schedulers are associated with a centralized radio access network, CRAN. In some embodiments, the network node 22a is a configured to perform baseband processing in the CRAN.

Figure 4:
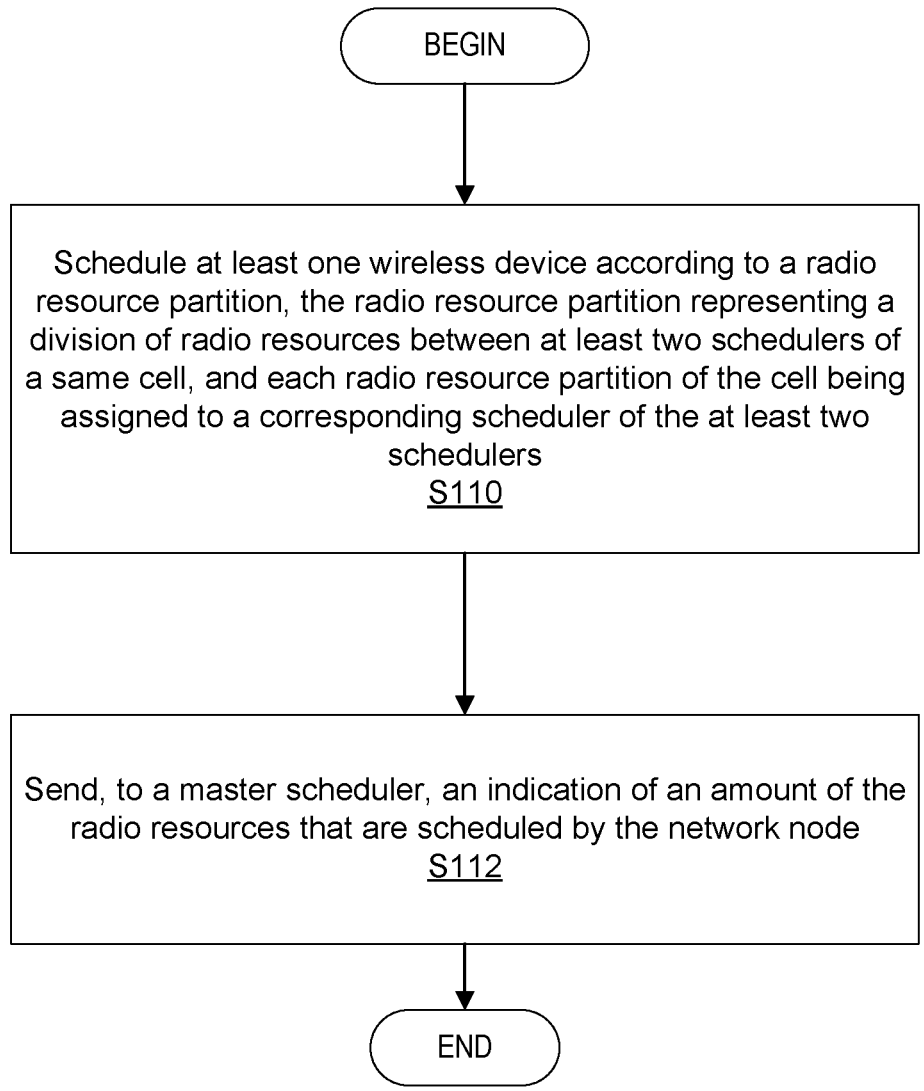
FIG. 4 is a flowchart of an example method for a network node for a contributor scheduling unit according to one embodiment of the present disclosure.

FIG. 4 is a flowchart of an exemplary process in another network node 22, such as network node 22b (e.g., contributor scheduler) according to some embodiments of the present disclosure. One or more Blocks and/or functions and/or methods performed by the network node 22b may be performed by one or more elements of network node 22b such as by contributor scheduling unit 30, processing circuitry 42, processor 46, memory 44, communication interface 40, etc. The example method includes scheduling (Block S110), such as via contributor scheduling unit 30, processing circuitry 42, processor 46, memory 44 and/or communication interface 40, at least one wireless device 20 according to a radio resource partition, the radio resource partition representing a division of radio resources between at least two schedulers of a same cell, and each radio resource partition of the cell being assigned to a corresponding scheduler of the at least two schedulers. The method includes sending (Block S112), such as via contributor scheduling unit 30, processing circuitry 42, processor 46, memory 44 and/or communication interface 40, to a master scheduler, an indication of an amount of the radio resources that are scheduled by the network node 22b.

In some embodiments, the method further includes receiving, such as via contributor scheduling unit 30, processing circuitry 42, processor 46, memory 44 and/or communication interface 40, from the master scheduler, an indication of a size of the radio resource partition that is assigned to the network node 22b. In some embodiments, the size of the radio resource partition that is assigned to the network node 22b is adjusted based at least in part on the indication of the amount of the radio resources that are scheduled by the network node 22b. In some embodiments, the size of the radio resource partition that is assigned to the network node 22b is adjusted based at least in part on a predetermined target condition. In some embodiments, scheduling the at least one wireless device 20 according to the radio resource partition further includes scheduling, such as via contributor scheduling unit 30, processing circuitry 42, processor 46, memory 44 and/or communication interface 40, per time slot, the at least one wireless device 20: in a frequency range corresponding to the radio resource part that is assigned to the network node 22b; and according to a scheduling order associated with the assigned radio resource partition.

In some embodiments, the scheduling order relates to scheduling using resources starting from an end of the frequency range toward an opposite end of the frequency range. In some embodiments, the method further includes receiving, such as via contributor scheduling unit 30, processing circuitry 42, processor 46, memory 44 and/or communication interface 40, from the master scheduler, an indication of at least one additional resource outside of the radio resource partition that is assigned to the network node 22b, the at least one additional resource being located in an adjacent radio resource partition. In some embodiments, the at least one additional resource is located in the adjacent radio resource partition based at least in part on a scheduling order associated with the adjacent radio resource partition and a scheduling order associated with the radio resource partition that is assigned to the network node 22b.

In some embodiments, the method further includes receiving, such as via contributor scheduling unit 30, processing circuitry 42, processor 46, memory 44 and/or communication interface 40, from the master scheduler, an indication of a scheduling conflict between the network node 22b and at least one other scheduler; and responsive to the received indication of the scheduling conflict, dropping, such as via contributor scheduling unit 30, processing circuitry 42, processor 46, memory 44 and/or communication interface 40, at least one scheduled resource that is in conflict prior to sending the scheduling for the at least one wireless device 20 to a physical layer for encoding.

In some embodiments, the method further includes sending, such as via contributor scheduling unit 30, processing circuitry 42, processor 46, memory 44 and/or communication interface 40, per time slot, the scheduling for the at least one wireless device 20 to a multiplexer, MUX, to assemble a radio frame, the radio frame comprising scheduling performed by each of the at least two schedulers for the time slot. In some embodiments, the network node 22b is associated with a priority level and a size of the radio resource partition that is assigned to the network node 22b is based at least in part on the priority level. In some embodiments, the scheduling is a physical layer scheduling. In some embodiments, the at least two schedulers are associated with a centralized radio access network, CRAN. In some embodiments, the network node 22b is configured to perform baseband processing in the CRAN.

Having described the general process flow of arrangements of the disclosure and having provided examples of hardware and software arrangements for implementing the processes and functions of the disclosure, the sections below provide details and examples of arrangements for centralized radio access network (CRAN) scalability with e.g., loosely coupled processing systems, which may be implemented by the network nodes 22.

Some embodiments of the present disclosure provide arrangements supporting collaboration between independent schedulers (e.g., network nodes 22) to dynamically share spectrum resources.

Some embodiments of the present disclosure provide for radio resource partitioning between the individual schedulers (e.g., network nodes 22), which may be gradually and/or dynamically adjusted over time based on e.g., statistical radio resource/spectrum usage history and/or an end goal policy/target condition (e.g., software migration, capacity balancing, etc.). In some embodiments, to further optimize radio resource utilization, the individual schedulers (e.g., network nodes 22) may also be allowed to tentatively/temporarily use more resources than is available in the scheduler's assigned radio resource (RR) partition. In some embodiments, one scheduler (e.g., network node 22a), called the master-scheduler herein, is configured to generate, such as via processing circuitry 34, the common channels in the cell and also to arbitrate (and/or manage) between resource utilization by the individual schedulers (e.g., network nodes 22).

Generally, there are several different use cases where the proposed arrangements of collaboration between schedulers (e.g., network nodes 22) may be applied. The following are non-limiting examples:

Slicing: where each scheduler (e.g., network node 22) handles the resources associated with a vertical slice.

Priority slicing: where the high priority slices are assigned larger radio resource partitions than lower priority slices and the lower priority slices may be allowed to opportunistically (e.g., per scheduler request per slot) use the radio resources not in use by the higher priority slices. For example, a scheduler handling Internet-of-Things (Iot) WDs 20 may be assigned 10% of the spectrum/carrier/radio resource, while a scheduler handling regular mobile broadband WDs 20 may be assigned 90% of the spectrum/carrier/radio resources.

Software migration: software migration usually involving two schedulers (e.g., network nodes 22), where one scheduler is running an older version of the software and the other scheduler is running the new version of the software. WDs 20 may be gradually migrated to the scheduler running the newer version of the software and the radio resource partition assigned to that scheduler may gradually increase, while the radio resource partition assigned to the scheduler running the older version may gradually shrink to zero as the live migration occurs.

Capacity balancing: where several schedulers (e.g., network nodes 22) are sharing the load for one cell.

Scaling in/scaling out: where schedulers (e.g., network nodes 22) running on different processing resources are added or removed from a CRAN to handle the cell load variation (e.g., higher cell load results in schedulers being added and lower cell load results in schedulers being removed).

Each independent scheduler may be assigned to handle a pool of WDs 20 or types of services for which such scheduler (e.g., network node 22) is responsible for scheduling in the assigned radio resource partition.

One of the schedulers may be designated to be the master scheduler (e.g., network node 22a and/or master scheduling unit 28), and it is in charge of generating the common channels, as well as arbitrating in case there are resource conflicts between the other participating schedulers.

The spectrum/radio resources may be split/divided into individual radio resource partition, each of which may be assigned differently depending on the number of participating schedulers. In some embodiments, each scheduler (e.g., network node 22) may be allowed to potentially use more resources than assigned in its own radio resource partition. This may be accomplished when other schedulers (e.g., network nodes 22) are not fully utilizing their own radio resource partition.

In some embodiments, only one message (or a few messages) per scheduling time resource (e.g., slot or subframe) is exchanged, such as via communication interfaces 32 and 40, between the participating schedulers (e.g., network nodes 22) and the master scheduler (e.g., network node 22a and/or master scheduling unit 28) in order to communicate the amount of radio resources being used in the time resource by the schedulers. In some embodiments, only one message (or a few messages) is sent from the master scheduler (e.g., network node 22a and/or master scheduling unit 28), via communication interface 32, to the participating schedulers (e.g., network node 22b and/or contributor scheduling unit 30) to communicate the amount of extra/additional resources, outside of the radio resource partition assigned to the scheduler (in other words, beyond the pre-allocated partition size), that can be used in the current scheduling time resource (e.g., current slot).

Figure 5:
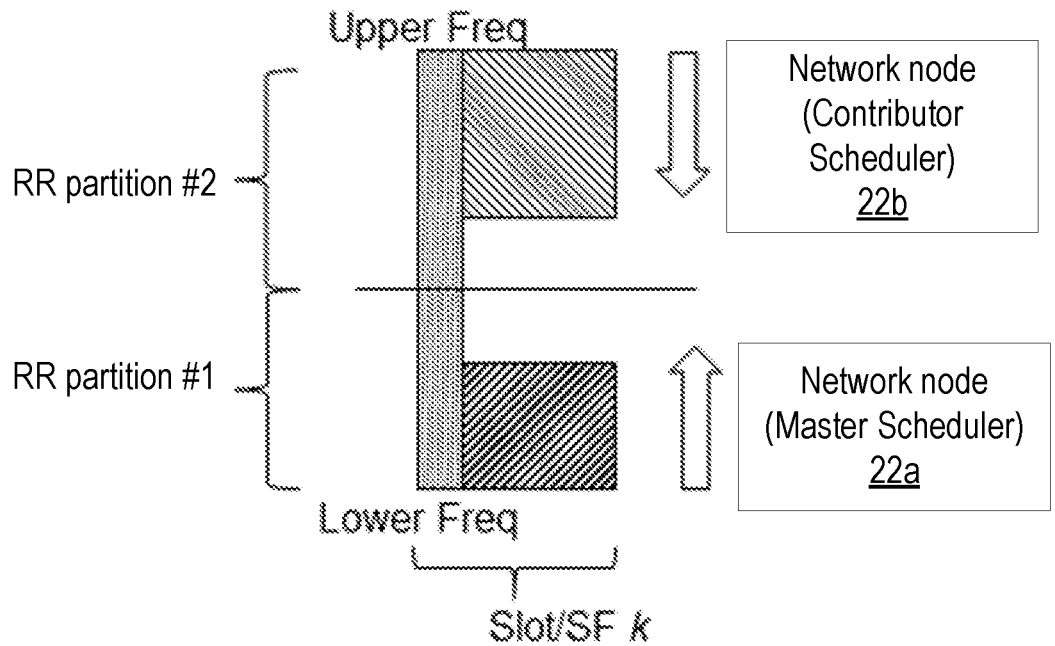
FIG. 5 is a schematic diagram illustrating an example of a shared carrier between two participating schedulers according to one embodiment of the present disclosure.

For example, FIG. 5 shows an example resource diagram in which a carrier is shared between two participating schedulers, network node 22a and network node 22b (e.g., one master scheduler, such as master scheduling unit 28 and one contributor scheduler, such as contributor scheduling unit 30). In this example, the shared carrier is partitioned into two radio resource (RR) partition, RR partition #1 and RR partition #2. Each RR partition may be considered to be a continuous sub-section of a shared carrier that corresponds to a contiguous set of radio resources and which is assigned to a respective participating scheduler (e.g., network nodes 22)

As shown in FIG. 5, the shared carrier may be considered to have a frequency range of between an upper frequency end and a lower frequency end of the carrier. FIG. 5 depicts an example of a scheduling order/sequence in which resources are scheduled by each scheduler (e.g., network node 22), from the opposite ends of the frequency range assigned for the shared carrier. For example, master scheduler (e.g., network node 22a and/or master scheduling unit 28) is assigned RR partition #1 and contributor scheduler (e.g., network node 22b and/or contributor scheduling unit 30) is assigned RR partition #2 in slot/subframe k (k is a time resource index). In terms of the scheduling order, network node 22a is scheduling in a frequency direction from the lower frequency end, while network node 22b is scheduling in a frequency direction from the upper frequency end toward the center of the shared carrier, as indicated by the directional arrows adjacent each network node 22 in FIG. 5. The scheduling order/direction that a scheduler uses to schedule/allocate radio resources to WDs 20 within its assigned RR partition may be indicated to the scheduler by another network node, such as, for example master scheduler (e.g., network node 22a and/or master scheduling unit 28 via communication interface 32). As can be seen, in this example of FIG. 5, both network nodes 22a and 22b are using less than the assigned RR partition within slot/subframe k.

Figure 6:
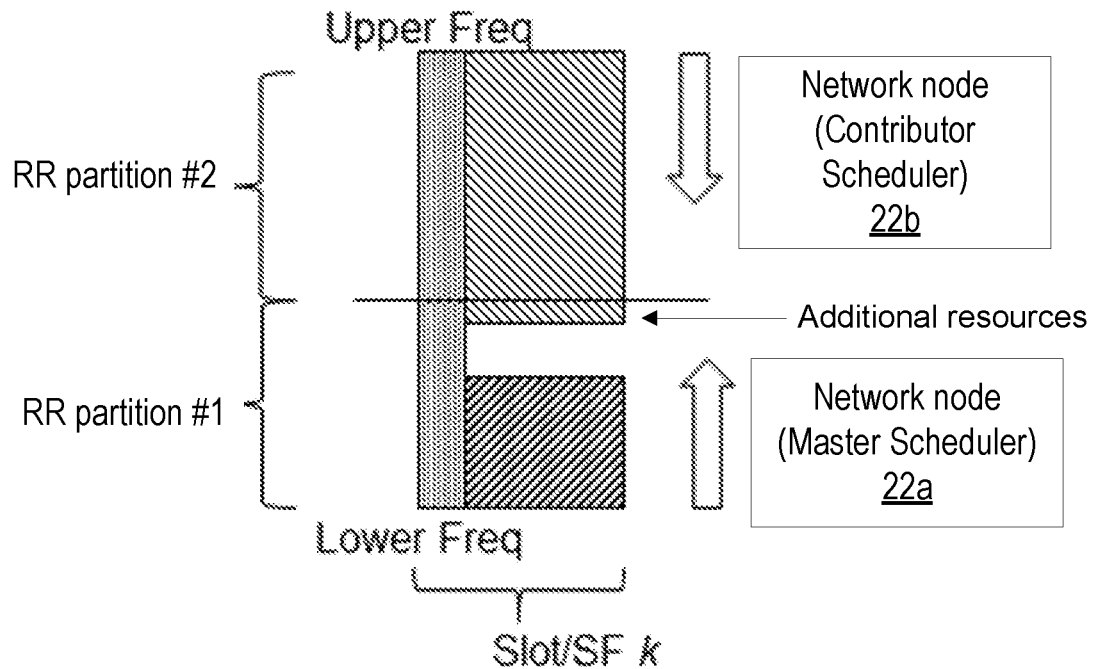
FIG. 6 is a schematic diagram illustrating an example of a shared carrier between two participating schedulers in which one scheduler is granted additional resources outside its assigned radio resource part according to one embodiment of the present disclosure.

FIG. 6 depicts an example in which network node 22b has its full assigned RR partition #2 scheduled for slot k, while network node 22a has less than its full assigned RR partition #1 scheduled for slot k. In this example, because of the scheduling direction toward an adjacent RR partition in which there is additional resources available, the master scheduler, network node 22a and/or master scheduling unit 28, has given the contributor scheduler, network node 22b and/or contributor scheduling unit 30, permission, such as via communication interfaces 32 and 40, to continue scheduling/allocating resources to WDs 20 in the frequency direction toward the adjacent RR partition, in this case RR partition #1. In this manner and with a few short messages between schedulers, additional resources may be dynamically used by schedulers outside of their assigned RR partition.

For example, in some embodiments, the contributor scheduler, network node 22b may work/schedule independently of the other schedulers, such as independently of the master scheduler, network node 22a having master scheduling unit 28. Accordingly, contributor scheduler, network node 22b having contributor scheduling unit 30 may independently schedule more subcarriers than is available in its pre-allocated partition (e.g., RR partition #2), and network node 22b may perform such scheduling without permission from the master scheduler, network node 22a. Subsequently, in some embodiments, before forwarding this RR allocation towards the radio access point, e.g., before forwarding this RR allocation to a multiplexing function block (MUX) which assembles the radio frame together and forwards the assembled radio frame to the radio access point (e.g., RAP 16a), the contributor scheduler, network node 22b may request from the master scheduler, network node 22a permission/confirmation to use the extra subcarriers outside its pre-allocated partition. If contributor scheduler, network node 22b receives a positive answer (e.g., yes), then contributor scheduler, network node 22b forwards the current RR allocation towards the radio access point, e.g., to the MUX. Otherwise, if contributor scheduler, network node 22b receives a negative answer (e.g., no), or does not receive any answer, network node 22b trims the subcarriers that are outside its pre-allocated partition (e.g., RR partition #2), and then forwards the resulting allocation to the MUX. In some embodiments, the master scheduler, network node 22a permission is used to confirm that the scheduling outside of the pre-allocated partition (e.g., RR partition #2) is allowed, but the permission may be provided after the scheduling has already been performed by the contributor scheduler, network node 22b.

Figure 7:
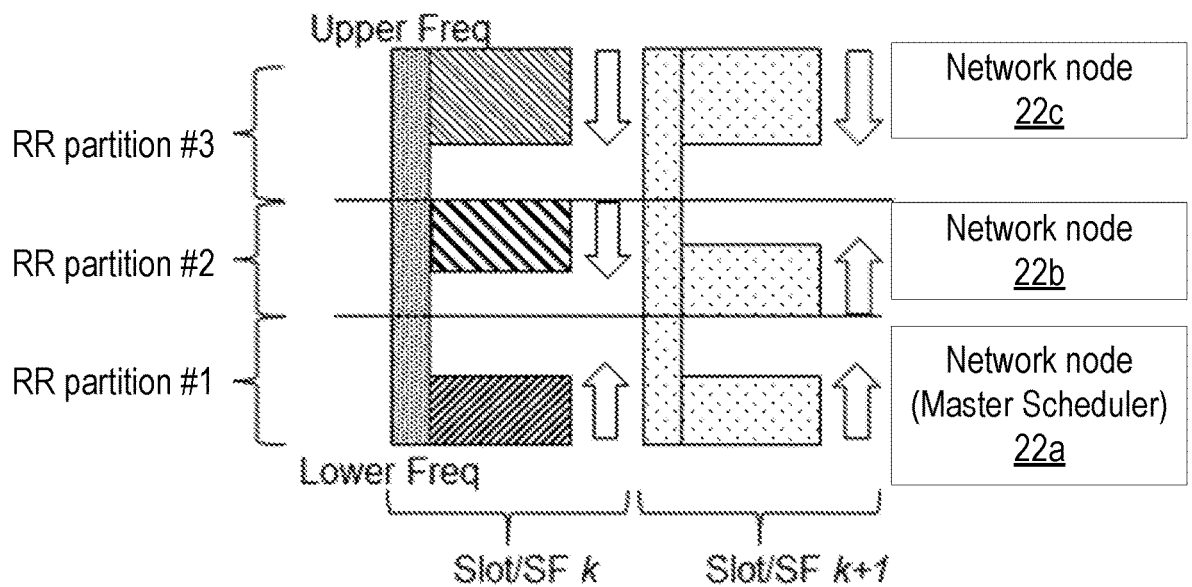
FIG. 7 is a schematic diagram illustrating an example of a shared carrier between three participating schedulers according to one embodiment of the present disclosure.

FIG. 7 depicts an example of three participating schedulers (one master scheduler, network node 22a and/or master scheduling unit 28, and two contributor schedulers, network nodes 22b and 22c and/or contributor scheduling units 30). FIG. 7 captures a scheduling order in which the resources are scheduled in two consecutive time resources (e.g., slot/subframes k and k+1). As can be seen, the scheduling order for one the schedulers, network node 22b and/or contributor scheduling unit 30, is switched from a downward scheduling direction toward the lower frequency end in slot/subframe k to an upward scheduling direction toward the upper frequency end in slot/subframe k+1. Thus, in some embodiments, the scheduling order/direction can change as between time sources via e.g., a message from the master scheduler, such as network node 22a and/or master scheduling unit 28.

Figure 8:
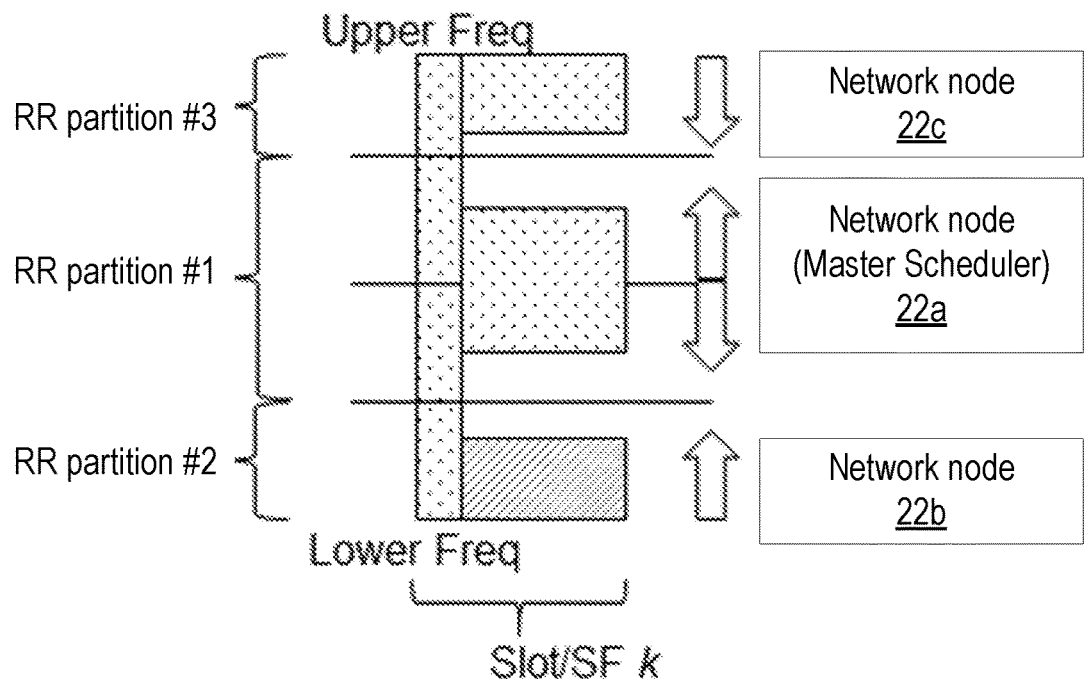
FIG. 8 is a schematic diagram illustrating yet another example of a shared carrier between three participating schedulers according to another embodiment of the present disclosure.

Alternatively, or additionally, in some embodiments, as shown in FIG. 8, the three participating schedulers can use a scheme in which one RR partition, RR partition #1, is filled in/scheduled from a center of the shared carrier (and/or a center of the RR partition), while the other RR partitions, RR partition #2 and RR partition #3, are filled in/scheduled from the absolute ends of the shared carrier, as shown in FIG. 8. This may be very useful in case the one scheduler, such as master scheduler network node 22a and/or master scheduling unit 28, is used for a higher priority slice that has access for most of the resources in the shared carrier, while the contributor schedulers, network nodes 22b and 22c and/or contributor scheduling units 30, can opportunistically use available additional resources when not used/not scheduled by network node 22a.

Figure 9:
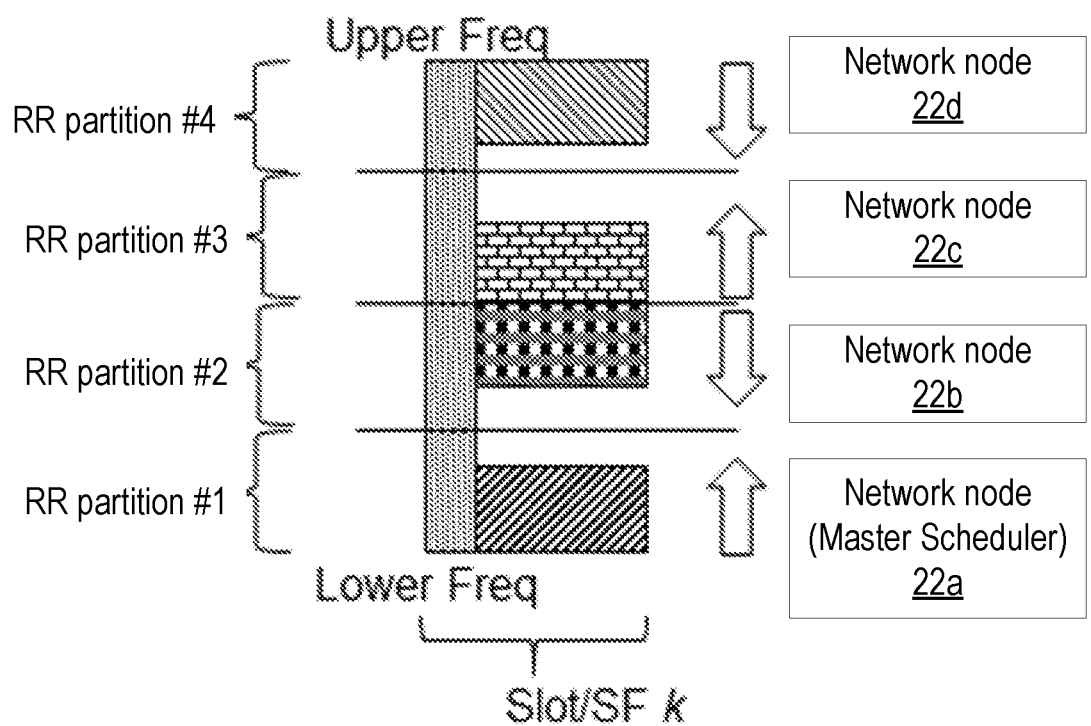
FIG. 9 is a schematic diagram illustrating yet another example of a shared carrier between four participating schedulers according to one embodiment of the present disclosure.

FIG. 9 illustrates an example of four participating schedulers (e.g., network nodes 22a, 22b, 22c and 22d) scheduling in the shared carrier/radio resources according to one or more radio resource partitions e.g., RR partition #1, RR partition #2, RR partition #3 and RR partition #4. Each of the RR partition are scheduling by the corresponding scheduler according to a particular scheduling order, as shown in FIG. 9. Each of the RR partition may be the same size in some embodiments, while the sizes may vary in other embodiments.

Figure 10:
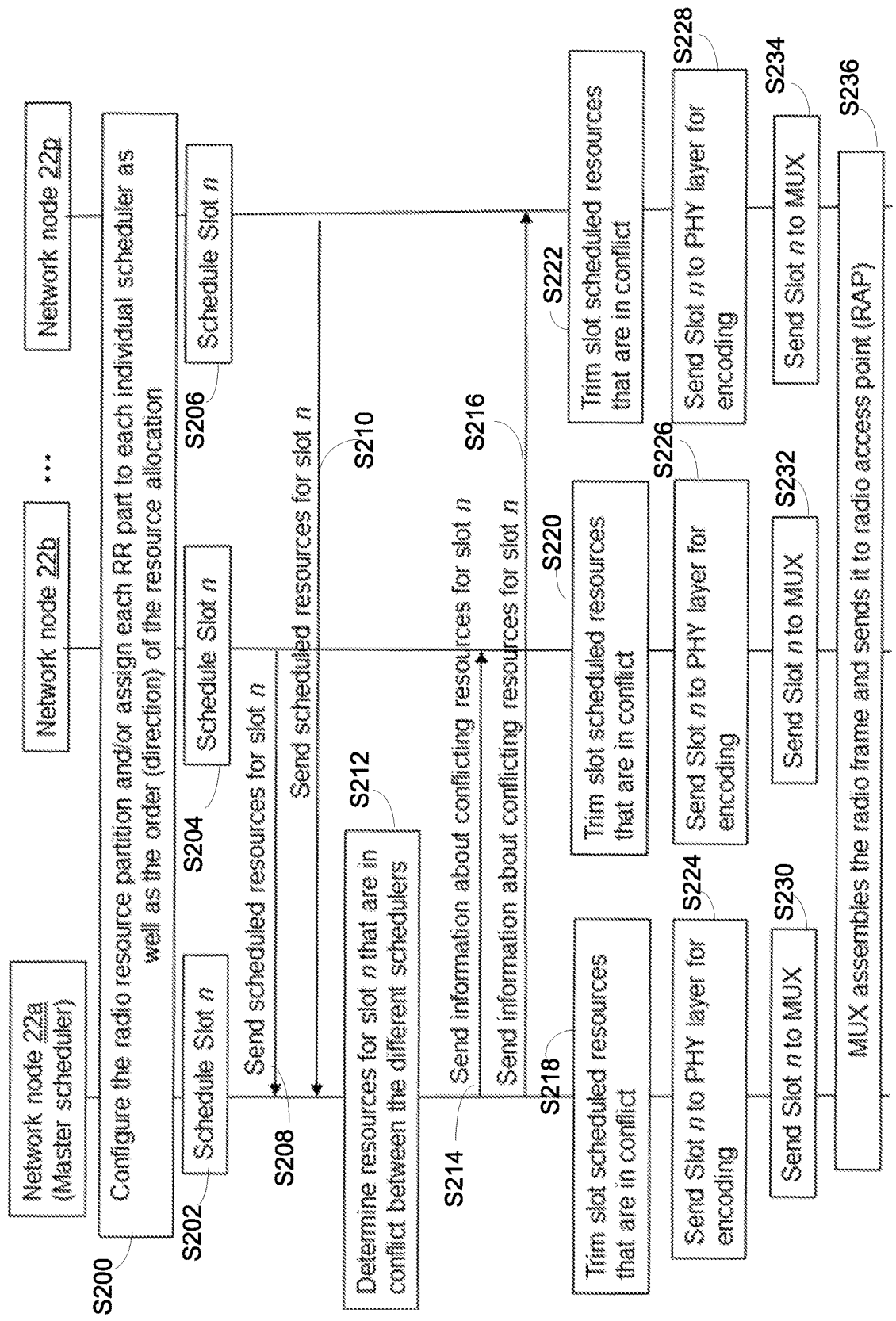
FIG. 10 is a call flow diagram illustrating an example of messaging that may be exchanged between participating schedulers according to some embodiments of the present disclosure.

FIG. 10 depicts an example call flow diagram according to some embodiments of the present disclosure. In step S200, the participating schedulers (e.g., network nodes 22a, 22b . . . 22p) may be configured according to the radio resource partition and/or each RR partition may be assigned to the individual participating schedulers (e.g., network nodes 22a, 22b . . . 22p) as well as the scheduling order/direction of the resource allocation. In some embodiments, the master scheduler, network node 22a, may perform the configuration and/or assignments, such as via processing circuitry 34 and/or communication interface 32. In some embodiments, this may be performed by another network node.

In steps S202-S206, each network node 22 may schedule/allocate resources in slot n (n is a slot index). The example uses slot-based scheduling; however, it should be understood that some embodiments may perform scheduling according to another time resource, such as a subframe or sub-slot basis. In some embodiments, for each scheduling time resource (e.g., slot, subframe), the participating schedulers may report the amount of scheduled radio resources, as shown in FIG. 10. For example, in step S208 and S210, each of the contributor schedulers, network nodes 22b-22p, may send, such as in a message transmitted across transport network 26 via communication interface 40, an indication of the scheduled radio resources and/or the amount of scheduled radio resources for slot n. In some embodiments, such messages may only indicate the radio resources scheduled in the assigned RR part. In some embodiments, such messages may further indicate additional resources that the scheduler schedules in, which may extend outside of its assigned RR partition in the scheduling order/direction that is assigned to the scheduler. In step S212, master scheduler, network node 22a and/or master scheduling unit 28, may determine, such as via processing circuitry 34, resources for slot n that are in conflict between the different schedulers (e.g., double-booked resources). In step S214 and S216, master scheduler, such as network node 22a and/or master scheduling unit 28, may send information, such as via communication interface 32, about any conflicting resources for slot n to the respective contributing schedulers, such as network nodes 22b-22p and/or contributor scheduling units 30.

As a result of the information about conflicting resources, the participating schedulers (e.g., network nodes 22a, 22b . . . 22p) may discard any resources that are indicated as being in conflict (e.g., double-scheduled by different schedulers). For example, in steps S218-S222, the participating schedulers (network nodes 22a, 22b . . . 22p) may trim/drop any slot scheduled resources that are in conflict. In case a message is lost or not received in time, the participating schedulers (e.g., network nodes 22a, 22b . . . 22p) may assume that they only have access to the resources within their assigned RR partition (and trim/drop any resources outside of their assigned RR partition).

In steps S224-S228, the participating schedulers (network nodes 22a, 22b . . . 22p) may send the slot n scheduling/resource allocation to the physical layer (PHY) for encoding. The encoded data may be sent to a multiplexing function block (MUX) which assembles the radio frame together and forwards the assembled radio frame to the radio access point (e.g., RAP 16a). For example, in steps S230-S234, the participating schedulers (network nodes 22a, 22b . . . 22p) may send the slot n scheduling/resource allocation to a shared/common MUX. The MUX can be either hosted by the master scheduler processing system (e.g., processing circuitry 34) or the MUX can be hosted by the radio access point (e.g., RAP 16a). Alternatively, the MUX may be a separate processing unit. In step S236, the radio frame is assembled and sent to RAP 16a. The RAP 16a may then transmit the radio frame in e.g., a downlink channel, to one or more WDs 20 at the cell/coverage area 18a. The process may be repeated for each subsequent scheduling time resources (e.g., slot, subframe).

In some embodiments, a size of the assigned RR partition, for each participating scheduler, may be slowly adjusted overtime based on e.g., the statistical usage history and/or an end-goal/target condition of a particular use case. For example, if the use case involves migrating WDs 20 from one processing system to another, then the size of the assigned RR partition for the scheduler that is being depopulated is never increased, regardless of the usage history, but rather slowly decreased until all the WDs 20 have been migrated.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node operating as a master scheduler, the method comprising:
    scheduling at least one wireless device according to a radio resource partition, the radio resource partition representing a division of radio resources between at least two schedulers of a same cell, and each radio resource partition of the cell being assigned to a corresponding scheduler of the at least two schedulers;
    indicating, to the at least two schedulers, the scheduling order to schedule radio resources to at least one wireless device within their assigned radio resource partition, the scheduling order comprising a frequency direction from an end of a frequency range towards the center of the frequency range, which frequency range is shared between the at least two schedulers;
    receiving, from at least one scheduler of the at least two schedulers, an indication of an amount of the radio resources that are scheduled by the at least one scheduler; and
    permitting the at least one scheduler to continue scheduling radio resources to at least one wireless device in the frequency direction toward an adjacent radio resource partition.

2. The method of claim 1, further comprising:
    adjusting a size of the radio resource partition that is assigned to the at least one scheduler based at least in part on the received indication.

3. The method of claim 1, further comprising:
adjusting a size of the radio resource partition that is assigned to the at least one scheduler based at least in part on a predetermined target condition.

4. The method of claim 2, further comprising:
sending, to the at least one scheduler, an indication of the adjusted size of the radio resource partition that is assigned to the at least one scheduler.

5. The method of claim 1, wherein scheduling the at least one wireless device according to the radio resource partition further comprises:
scheduling, per time slot, the at least one wireless device:
in a frequency range corresponding to the radio resource partition that is assigned to the network node; and
according to a scheduling order associated with the assigned radio resource partition.

6. The method of claim 5, wherein the scheduling order relates to scheduling using resources starting from an end of the frequency range toward an opposite end of the frequency range.

7. The method of claim 1, further comprising:
sending, to the at least one scheduler, an indication of at least one additional resource outside of the radio resource partition that is assigned to the at least one scheduler, the at least one additional resource being located in an adjacent radio resource partition.

8. The method of claim 7, wherein the at least one additional resource is located in the adjacent radio resource partition based at least in part on a scheduling order associated with the adjacent radio resource partition and a scheduling order associated with the radio resource partition that is assigned to the at least one scheduler.

9. The method of any one of claim 1, further comprising:
determining whether there is a scheduling conflict between at least two of the at least two schedulers; and
when there is a scheduling conflict, indicating the scheduling conflict to the at least two of the at least two schedulers.

10. The method of claim 1, further comprising:
sending, per time slot, the scheduling for the at least one wireless device to a multiplexer, MUX, to assemble a radio frame, the radio frame comprising scheduling performed by each of the at least two schedulers for the time slot.

11. The method of claim 1, wherein the at least one scheduler is associated with a priority level and a size of the radio resource partition that is assigned to the at least one scheduler is based at least in part on the priority level.

12. The method of claim 1, wherein one or more of:
the scheduling is a physical layer scheduling;
the at least two schedulers are associated with a centralized radio access network, CRAN; and
the network node is configured to perform baseband processing in the CRAN.

13. A method implemented in a network node, the method comprising:
scheduling at least one wireless device according to a radio resource partition, the radio resource partition representing a division of radio resources between at least two schedulers of a same cell, and each radio resource partition of the cell being assigned to a corresponding scheduler of the at least two schedulers;
indicating, to the at least two schedulers, the scheduling order to schedule radio resources to at least one wireless device within their assigned radio resource partition, the scheduling order comprising a frequency direction from an end of a frequency range towards the center of the frequency range, which frequency range is shared between the at least two schedulers;
sending, to a master scheduler, an indication of an amount of the radio resources that are scheduled by the network node; and
permitting the at least one scheduler to continue scheduling radio resources to at least one wireless device in the frequency direction toward an adjacent radio resource partition.

14. The method of claim 13, further comprising:
receiving, from the master scheduler, an indication of a size of the radio resource partition that is assigned to the network node.

15. The method of claim 14, wherein the size of the radio resource partition that is assigned to the network node is adjusted based at least in part on the indication of the amount of the radio resources that are scheduled by the network node.

16. The method of claim 14, wherein the size of the radio resource partition that is assigned to the network node is adjusted based at least in part on a predetermined target condition.

17. The method of claim 13, wherein scheduling the at least one wireless device according to the radio resource partition further comprises:
scheduling, per time slot, the at least one wireless device:
in a frequency range corresponding to the radio resource partition that is assigned to the network node; and
according to a scheduling order associated with the assigned radio resource partition.

18. The method of claim 17, wherein the scheduling order relates to scheduling using resources starting from an end of the frequency range toward an opposite end of the frequency range.

19. The method of claim 13, further comprising:
receiving, from the master scheduler, an indication of at least one additional resource outside of the radio resource partition that is assigned to the network node, the at least one additional resource being located in an adjacent radio resource partition.

20. The method of claim 19, wherein the at least one additional resource is located in the adjacent radio resource partition based at least in part on a scheduling order associated with the adjacent radio resource partition and a scheduling order associated with the radio resource partition that is assigned to the network node.

21. The method of claim 13, further comprising:
receiving, from the master scheduler, an indication of a scheduling conflict between the network node and at least one other scheduler; and
responsive to the received indication of the scheduling conflict, dropping at least one scheduled resource that is in conflict prior to sending the scheduling for the at least one wireless device to a physical layer for encoding.

22. The method of claim 13, further comprising:
sending, per time slot, the scheduling for the at least one wireless device to a multiplexer, MUX, to assemble a radio frame, the radio frame comprising scheduling performed by each of the at least two schedulers for the time slot.

23. The method of claim 13, wherein the network node is associated with a priority level and a size of the radio resource partition that is assigned to the network node is based at least in part on the priority level.

24. The method of claim 13, wherein one or more of:
- the scheduling is a physical layer scheduling;
- the at least two schedulers are associated with a centralized radio access network, CRAN; and
- the network node is configured to perform baseband processing in the CRAN.

25. A network node operating as a master scheduler, the network node comprising processing circuitry, the processing circuitry configured to cause the network node to:
- schedule at least one wireless device according to a radio resource partition, the radio resource partition dividing a radio resource between at least two schedulers of a same cell, and each radio resource partition of the cell being assigned to a corresponding scheduler of the at least two schedulers;
- indicate, to the at least two schedulers, the scheduling order to schedule radio resources to at least one wireless device within their assigned radio resource partition, the scheduling order comprising a frequency direction from an end of a frequency range towards the center of the frequency range, which frequency range is shared between the at least two schedulers;
- receive, from at least one scheduler of the at least two schedulers, an indication of an amount of the radio resources that are scheduled by the at least one scheduler; and
- permit the at least one scheduler to continue scheduling radio resources to at least one wireless device in the frequency direction toward an adjacent radio resource partition.

26. A network node comprising processing circuitry, the processing circuitry configured to cause the network node to:
- schedule at least one wireless device according to a radio resource partition, the radio resource partition representing a division of radio resources between at least two schedulers of a same cell, and each radio resource partition of the cell being assigned to a corresponding scheduler of the at least two schedulers;
- indicate, to the at least two schedulers, the scheduling order to schedule radio resources to at least one wireless device within their assigned radio resource partition, the scheduling order comprising a frequency direction from an end of a frequency range towards the center of the frequency range, which frequency range is shared between the at least two schedulers;
- send, to a master scheduler, an indication of an amount of the radio resources that are scheduled by the network node; and
- permit the at least one scheduler to continue scheduling radio resources to at least one wireless device in the frequency direction toward an adjacent radio resource partition.

\* \* \* \* \*